United States Patent [19]
Pinto

[11] Patent Number: 6,125,887
[45] Date of Patent: Oct. 3, 2000

[54] WELDED INTERCONNECTION MODULES FOR HIGH PURITY FLUID FLOW CONTROL APPLICATIONS

[76] Inventor: James V. Pinto, 19335 Peachtree Cir., Huntington Beach, Calif. 92648

[21] Appl. No.: 09/398,302

[22] Filed: Sep. 20, 1999

[51] Int. Cl.[7] .................................................. F16K 11/10
[52] U.S. Cl. ........................................ 137/884; 285/288.1
[58] Field of Search .................................... 137/271, 884; 285/288.1, FOR 103

[56] References Cited

U.S. PATENT DOCUMENTS

| | | | |
|---|---|---|---|
| 4,714,091 | 12/1987 | Wagner | 137/884 |
| 5,605,179 | 2/1997 | Strong, Jr. et al. | 137/884 |
| 5,769,110 | 6/1998 | Ohmi et al. | 137/269 |
| 5,819,782 | 10/1998 | Itafuji | 137/240 |
| 5,836,355 | 11/1998 | Markulec et al. | 137/884 |
| 5,860,676 | 1/1999 | Brzezicki et al. | 285/24 |
| 5,975,590 | 11/1999 | Cowan et al. | 285/133.11 |

*Primary Examiner*—John Fox
*Attorney, Agent, or Firm*—Leonard Tachner

[57] ABSTRACT

Welded modular blocks, provided in a variety of standard selectable configurations, permit fabrication of gas panels and other fluid flow control systems for high purity, leak-proof applications. Each module is pre-welded and provided with mating ports to receive gas control components such as valves, controllers, pressure regulators and the like. Each module is also provided with one or more connector tube stubs which may be welded to a tube stub of another module to form an array of modular blocks and associated components. The components are bolted to the modular blocks and may be readily removed for servicing. The welding of the standardized blocks obviates costly seals otherwise needed to prevent leakage.

6 Claims, 12 Drawing Sheets

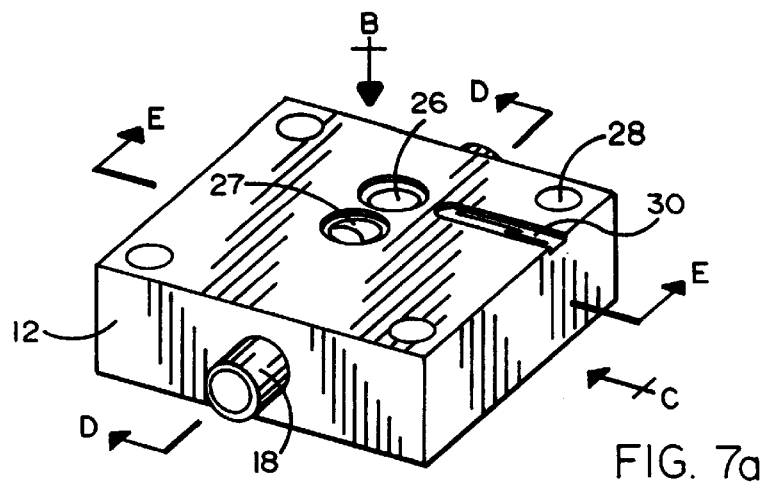
FIG. 7a
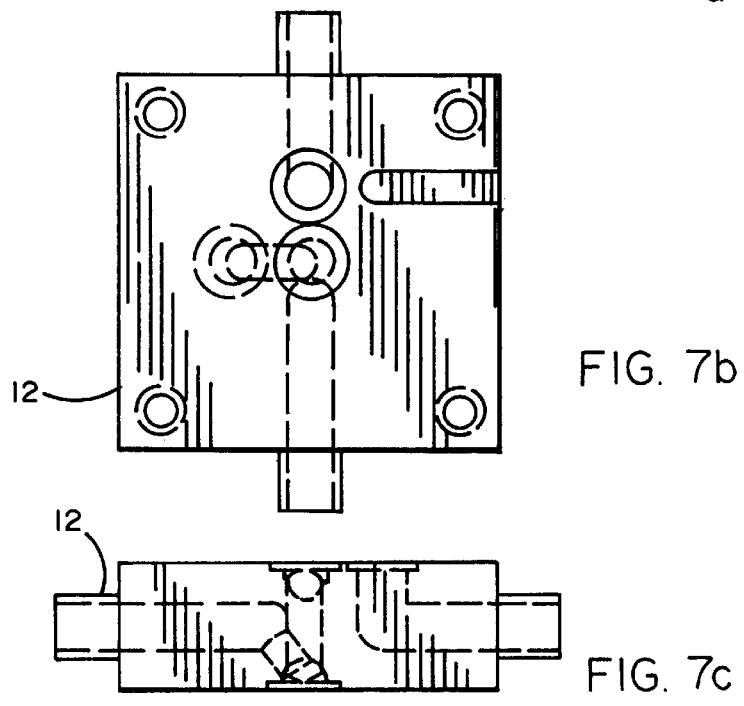
FIG. 7b
FIG. 7c
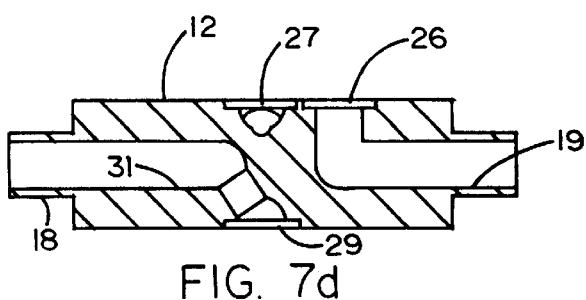
FIG. 7d
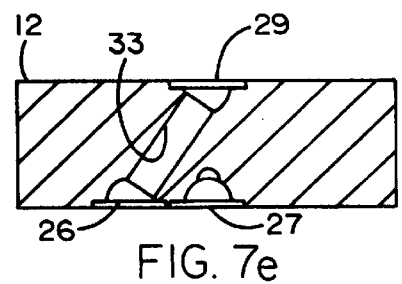
FIG. 7e

WELDED INTERCONNECTION MODULES FOR HIGH PURITY FLUID FLOW CONTROL APPLICATIONS

BACKGROUND OF THE INVENTION

1. Field of the Invention

The present invention relates generally to fluid handling systems for high purity semiconductor processing, analytical equipment and medical to non-high purity fluid handling applications that require a high degree of leak integrity. The invention relates more specifically to a welded modular block for use in such systems.

2. Background Art

There are various processes used involving inert to highly corrosive and toxic gases that require contaminant free, high purity platforms.

It may be appreciated that in each case pure carrier gases, fluids or reactant gases or agents must be supplied to a tool, bench system or panel in contaminant-free, leak free, precisely metered quantities. These systems use expensive stainless steel materials such as 304 or 316L, tube, VCR fittings, valves, mass flow controllers, pressure regulators, pressure transducers, micro fit fittings which are welded together using Tungsten Inert Gas (TIG) systems with an orbital welding head to weld tube stub and tubes together.

This integration must take place in clean room environment. All components in a modern-day gas or fluid handling system must have special surface finishes in the flow path. Building these systems in a clean room environment with rubber gloves on and taking apart most components so they can be welded is cumbersome and time consuming. Gas and fluid systems can be located inside a cabinet or in a tool or special delivery system which are very expensive and when welded together in line, takes up a large area in such expensive facilities.

Installation or servicing the system can require special tooling and lines have to be cut to be installed or serviced. Long lines with weldments and VCR fittings with different components, need platforms to rest on. These lines tend to loosen and leak if not attended to.

Welding systems are relatively expensive and it is often difficult to weld fittings to small tubes that don't have sufficient metal to "grab on to". It takes a long time to train an operator and tool up for each weldment.

To help improve productivity, reduce wetting surfaces, improve serviceability and reduce footprint, the industry has taken the approach of developing manifolds that bolt together with a component that uses fasteners and seals instead of welding. These manifold systems bolt together and use an industry standard of 1.5 inch format used by all components such as valves, fitting regulators, etc. Expensive seals are required for such systems that bolt together with fasteners. Each component and block bolt together with such expensive seals which must meet very stringent leak tests.

There are numerous variations of these manifolds from a collection of individual blocks to long multiple station manifolds to interlocking segment type systems. They all have one common factor, the components bolt down to the top and the systems are machined in long sticks or are bolted together in smaller blocks in an attempt to eliminate welding. All of these variations are very costly to manufacture, particularly with an abundance of fasteners and seals that can still leak. A major problem has developed for customers who need changes to the systems which are application specific in nature. Redesigning and machining these manifolds is likely to be far more expensive than in welded systems.

In the developing of a gas panel with single block or bolted system which is far more costly to manufacture or assemble from one large block, changes can not be made without re-engineering and machining the entire piece, which is very costly. Any machine problems on one position could cause the entire part to be rejected. The size and weight of this type of system are high and they are very expensive to produce.

In addition, it has been found that the current, multiple bolted system does not have the leak integrity of a welded system. Bolted systems have additional cost in labor and expensive seals and bolts to complete the integration. Each bolted system is heavier and requires additional machining to complete. Bolted systems generally accommodate only one component in their platform. The welded system can accommodate two components, further reducing cost and wetted surfaces.

SUMMARY OF THE INVENTION

Blocks with multiple tube stubs are designed to connect with industry standard manual valves, pneumatic valves, solenoid valves, pressure regulators, pressure transducers, filters, purifiers and mass flow controllers. Any component can be bolted down to a cost effective welded block for easy service. This cost effective welded system substrate is used to attach industry standard active components and then combined into cost effective branching structures. Tube stub welded block systems reduce size and weight and increase leak integrity over current block systems that are bolted together.

The welded block system of the present invention may employ standard manual or new robotic placement Tungsten Inert Gas (TIG) automatic orbital welding head to autogenous weld the blocks' tube stubs together ensuring a safe and leak-proof system. The blocks are designed to act as a heat sink allowing for less deterioration of the surface finish at the point of attachment leading to a better surface finish for ultra clean applications. The heat sink design provides a relatively small, evenly positioned, weld bead giving good penetration and a minimum heat affected zone (HAZ) with symmetry which helps support the weld joint evenly. This cost effective welded system substrate is used to attach industry standard active components and then combined into cost effective branching structures.

The inventive block system self-aligning when welded together, and is machined by highly accurate CNC machines allowing the blocks to be pre-fabricated and prepared inexpensively in advance for a variety of different applications. The blocks can be made in a number of standard configurations to be ultimately welded at the point of use to create a cost effective, quick and easily configured manifold. An additional feature of the present device is that each block has a plurality of threaded mounting apertures so that each individual component has its own mount allowing for pre-fabricated components to be used in a variety of different configurations. Each bock uses an active device to be positioned and attached to a rectangular foot print, connecting to the narrow light weight block which can use one or both sides to populate the components by a plurality of fasteners. The device then is quickly and easily removable without disturbing the entire system. Gas panels and manifolding allows for being easily reconfigured and active devices may be safely replaced by unbolting and simply lifting off from the welded system. Traditional welded gas systems which use axial compression fittings for components that must be removed are well known in the industry to exhibit problems with install torque stack up of determined tolerances and loosening in transit. This becomes an additional service issue which adds further costs. The inventive block systems avoid all of these problems.

The rectangular block invention with separate tube stub connections allows for heating of individual active devices without expensive machining and heating of special components. Each block can be heated individual very accurately without affecting any other device. A heater can accommodate each individual component and heat the individual block bores when necessary to accommodate this type of process in a gas line of a system.

The standard dimension and box style allow active components to be suspended above the gas box allowing for circulation of purge and vacuum air around all assemblies.

The present invention thus provides the following enumerated advantages:
1. Having the block designed to SEMI-standard format to accept all SEMI-standard sealing formats;
2. Can use any universal fitting or seal combinations for different industries;
3. Can be made easily from any metal that can be welded;
4. Is simple and cost effective to manufacture;
5. Has a shorter wetting surface;
6. Has greater flexibility in design and can be welded from all sides;
7. Lighter weight;
8. Greater leak integrity by welding pieces together instead of using fasteners and seals;
9. By welding directly to the block, the block itself becomes a heat sink and has a larger base to automate the welding process and make a better weld;
10. Equipment available for robotic welding of blocks;
11. Components can be connected on both sides of each block thereby further reducing the wetted surface, cost and foot print;
12. Attaches to components that surface mount to reduce the risk of component contamination usually associated with the welded type components;
13. Bolt down components can be serviced easily without breaking the welds;
14. Can be polished easily to any surface finish;
15. Can be pre-manufactured and clean room bagged and sold as an off the shelf component.

OBJECTS OF THE INVENTION

It is therefore a principal object of the present invention to provide a welded modular gas flow block which may be formed into a number of selected flow configurations and may be used in high purity gas flow systems.

It is another object of the invention to provide a series of gas flow blocks for interconnection with flow control components and each other to form a fluid handling system with a high degree of leak integrity and can be used in high purity applications.

It is still another object of the invention to provide a gas flow panel for use in high purity, leak proof applications, the panel comprising a plurality of components interconnected by a series of welded modular blocks having a plurality of standardized flow configurations.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which:

FIG. 3, comprising

FIG. 4, comprising

FIG. 5, comprising

FIG. 6, comprising

FIG. 7, comprising FIGS. 7A through 7E, illustrates a fifth embodiment of a modular block;

FIG. 8, comprising FIGS. 8A through 8E, illustrates a sixth embodiment of a modular block;

FIG. 9, comprising

FIG. 10, comprising

FIG. 11, comprising FIG. 12, comprising

DETAILED DESCRIPTION OF A PREFERRED EMBODIMENT

Figure 1:
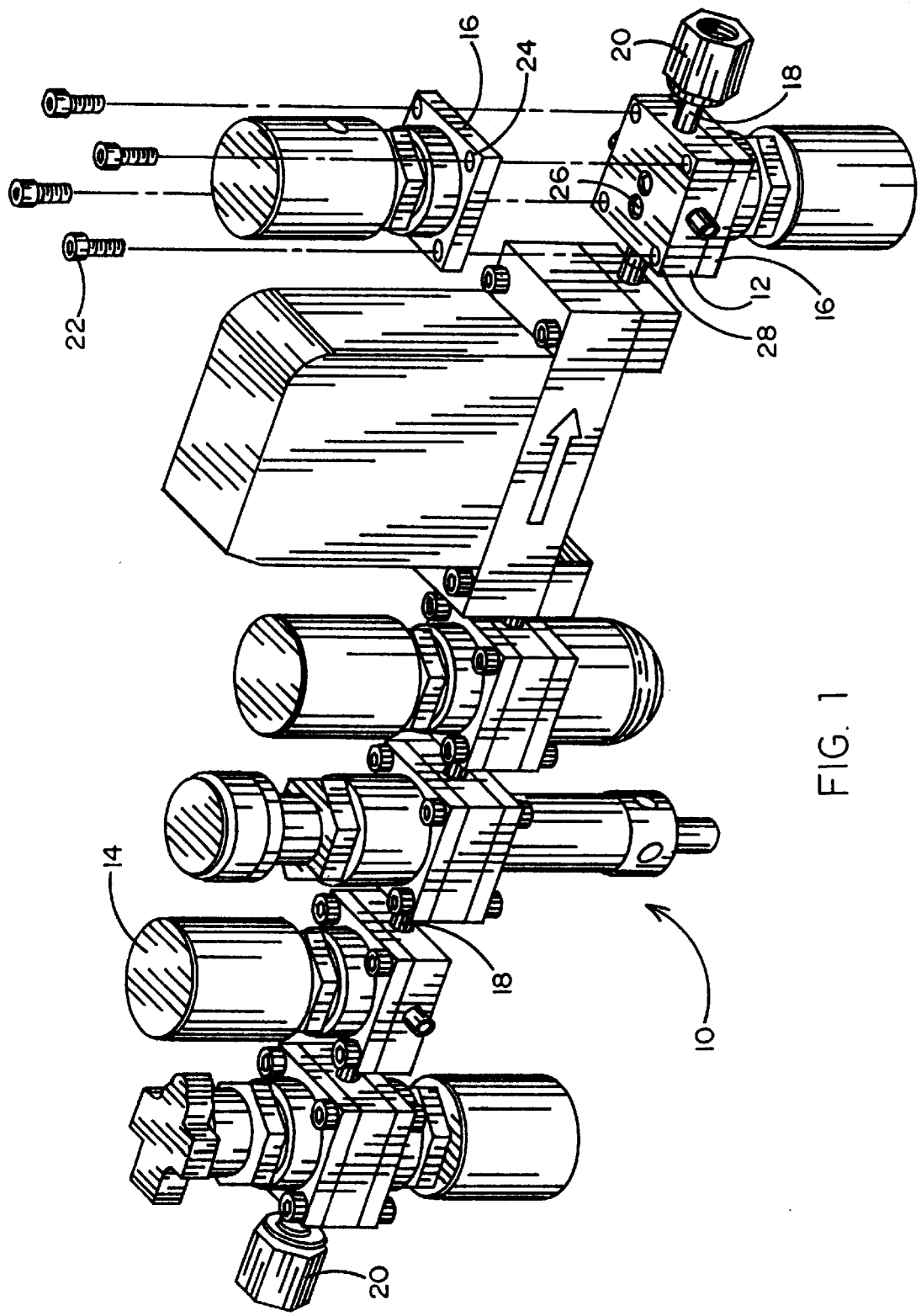
FIG. 1 is a three-dimensional, partially exploded view of a gas panel comprising a plurality of gas control components interconnected by a plurality of modular blocks in accordance with the present invention.
Figure 2:
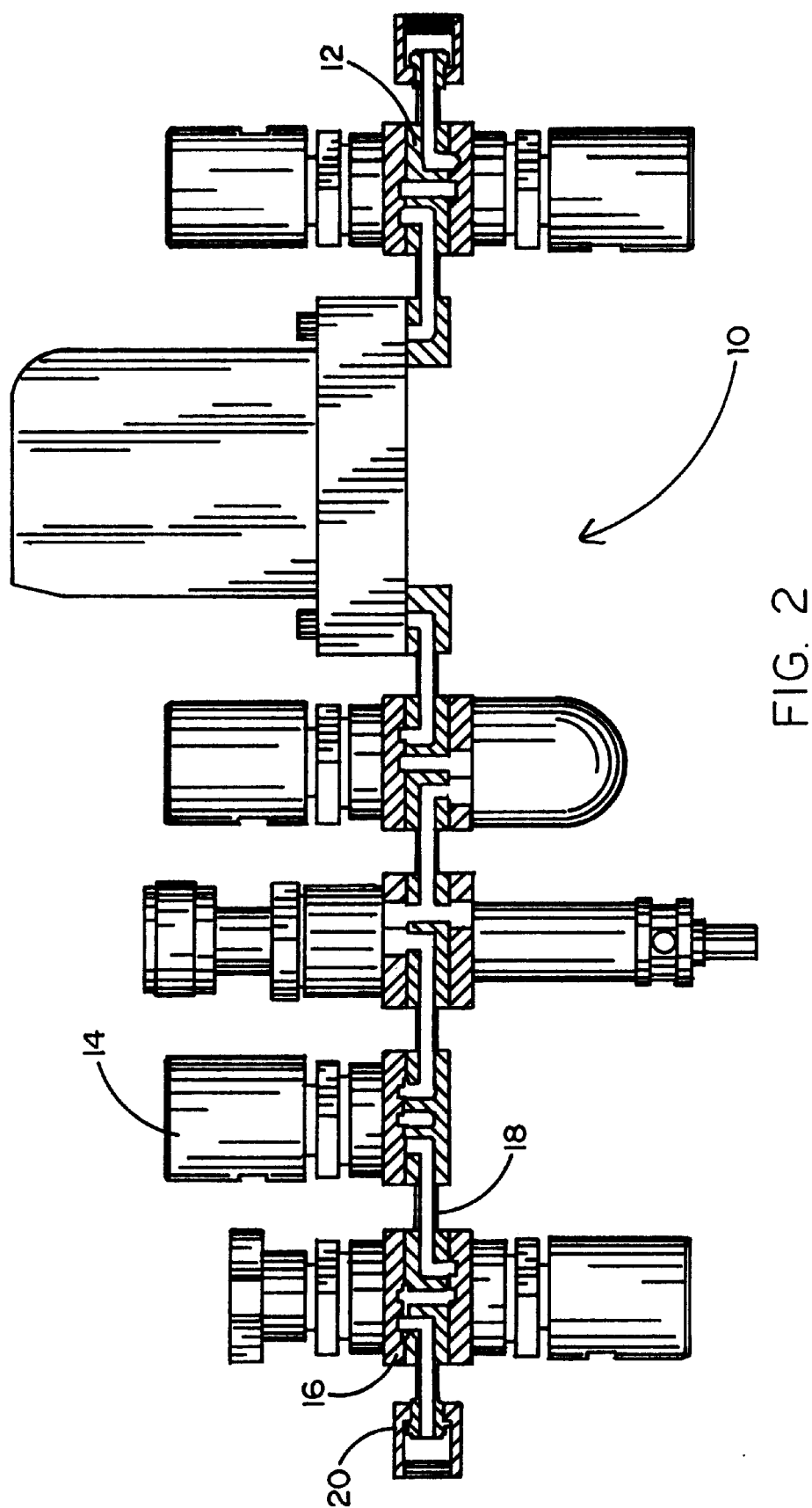
FIG. 2 is a partially cross-sectioned side view of the gas panel of FIG. 1.
Figure 3A:
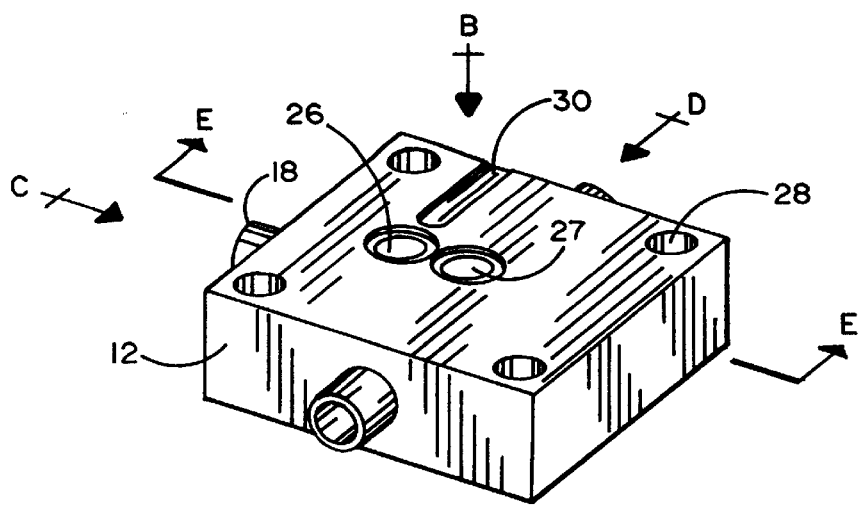
FIGS. 3A through 3E, illustrates a first embodiment of a modular block.
Figure 3B:
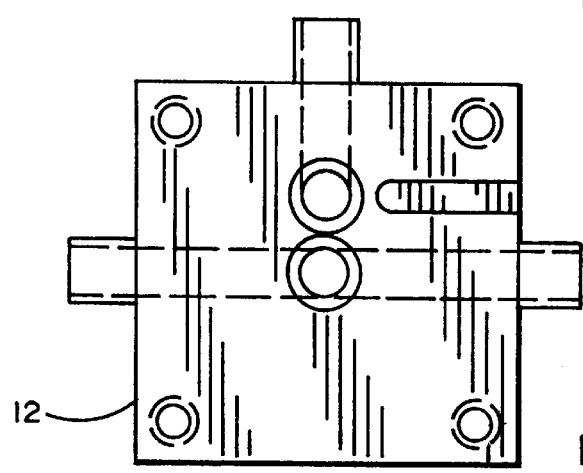
Figure 3C:
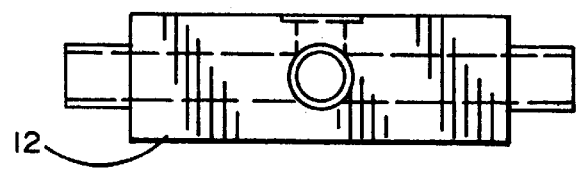
Figure 3D:
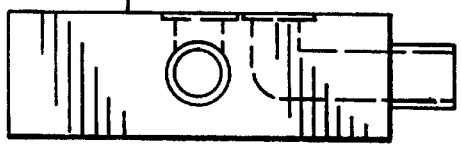
Figure 3E:
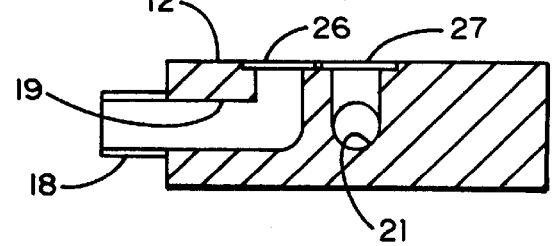
Figure 4A:
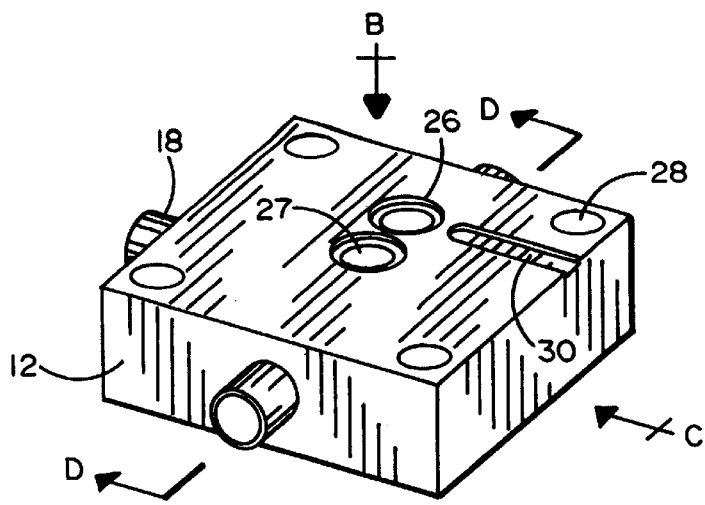
FIGS. 4A through 4D, illustrates a second embodiment of a modular block.
Figure 4B:
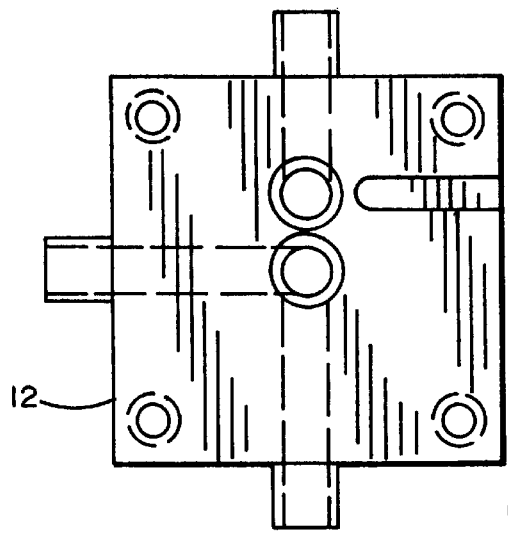
Figure 4C:
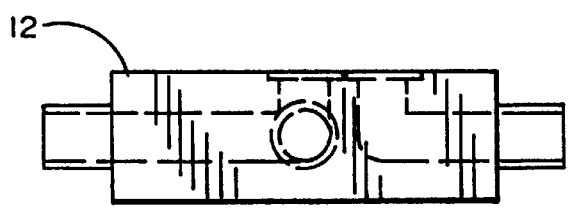
Figure 4D:
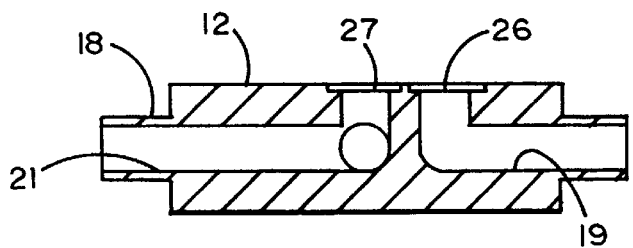
Figure 5A:
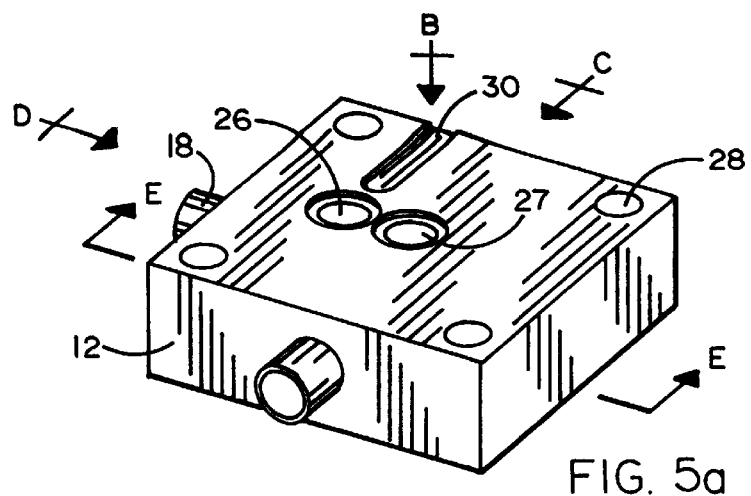
FIGS. 5A through 5E, illustrates a third embodiment of a modular block.
Figure 5B:
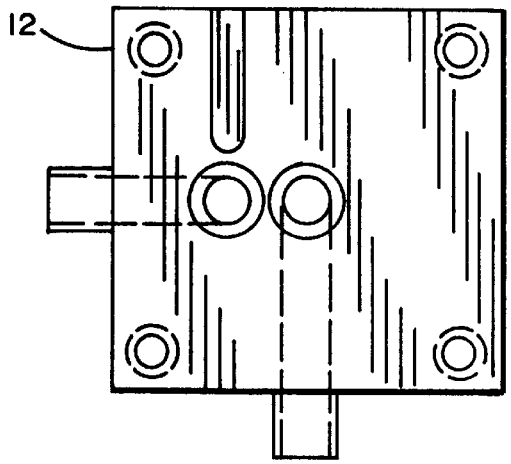
Figure 5C:
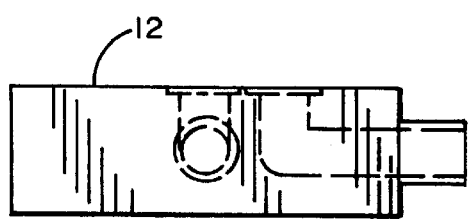
Figure 5D:
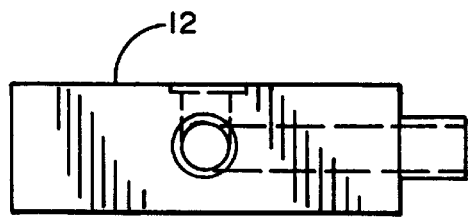
Figure 5E:
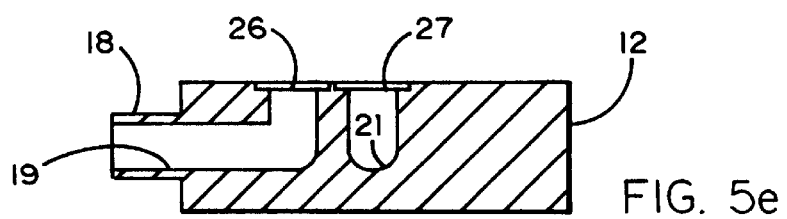
Figure 6A:
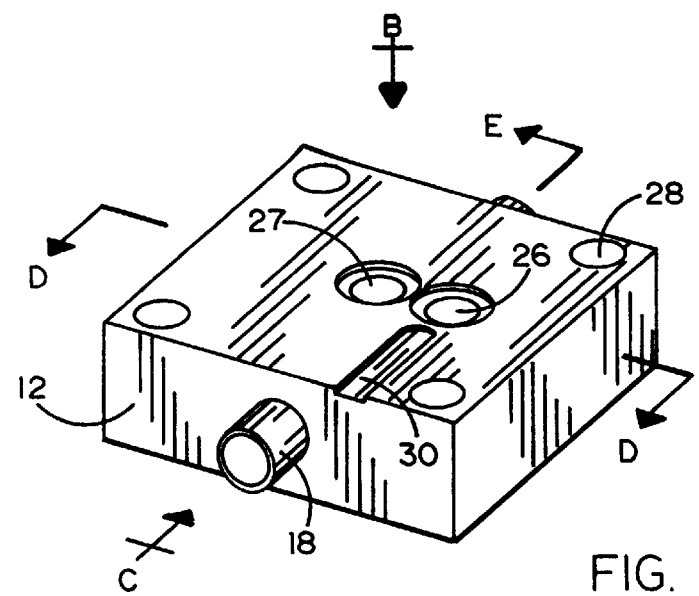
FIGS. 6A through 6D, illustrates a fourth embodiment of a modular block.
Figure 6B:
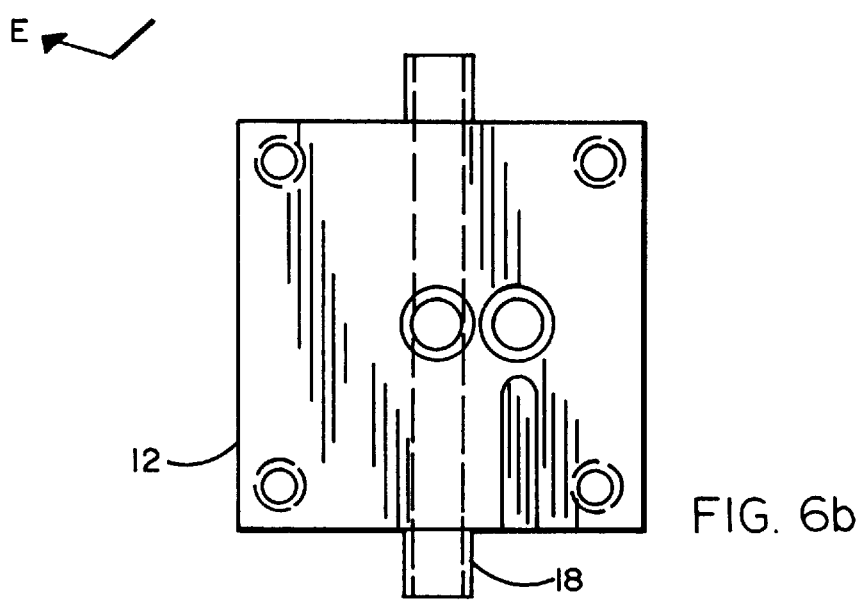
Figure 6C:
Figure 6D:
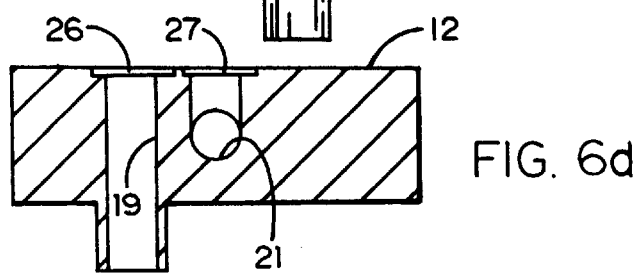
Figure 8A:
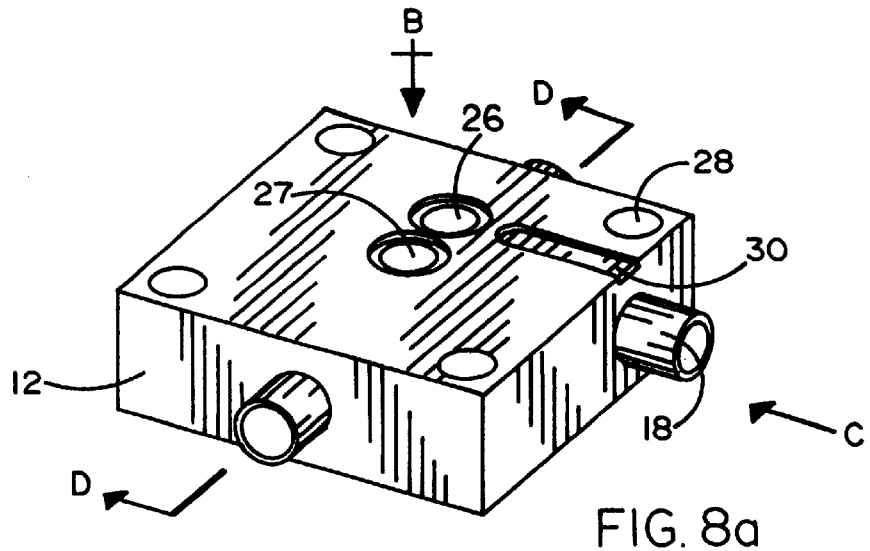
Figure 8B:
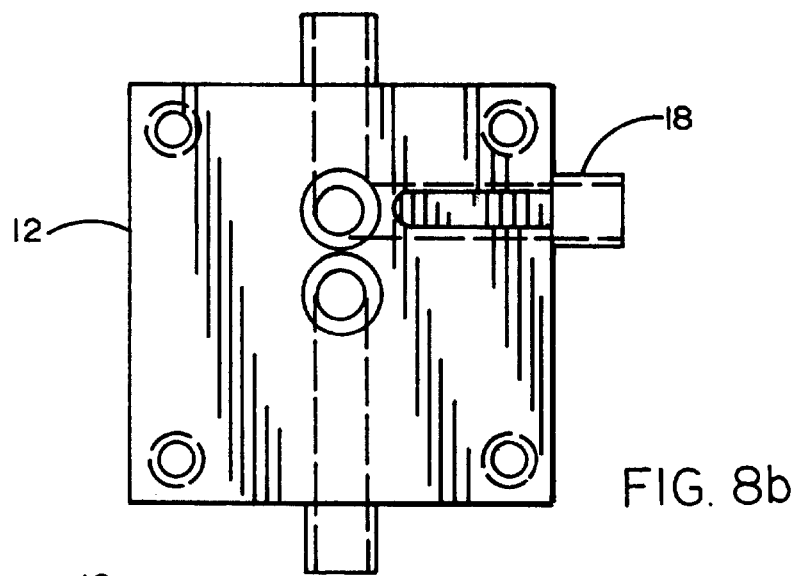
Figure 8C:
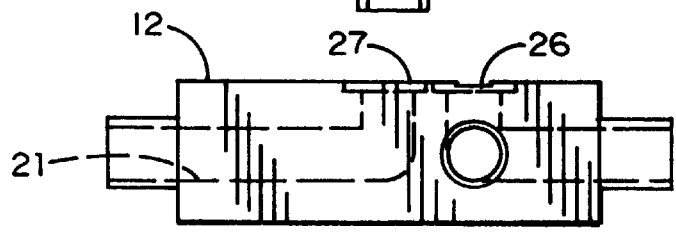
Figure 8D:
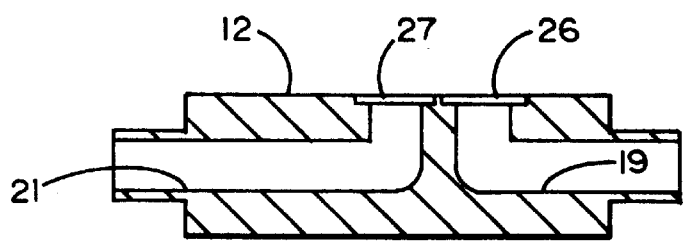
Figure 9A:
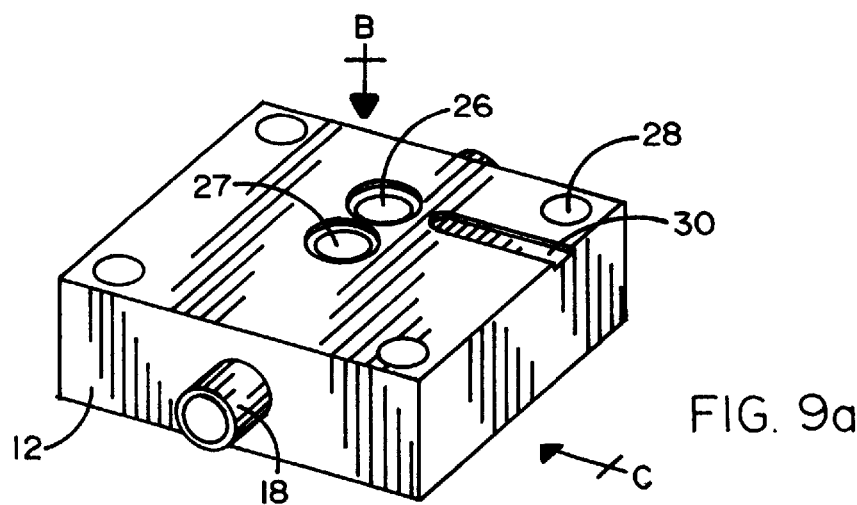
FIGS. 9A through 9D, illustrates a seventh embodiment of a modular block.
Figure 9B:
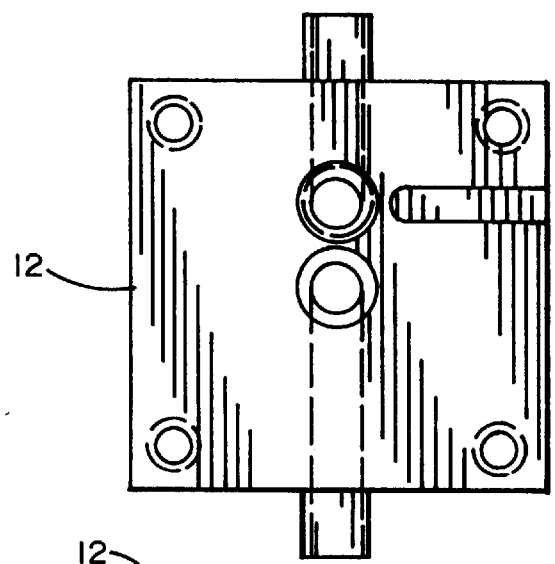
Figure 9C:
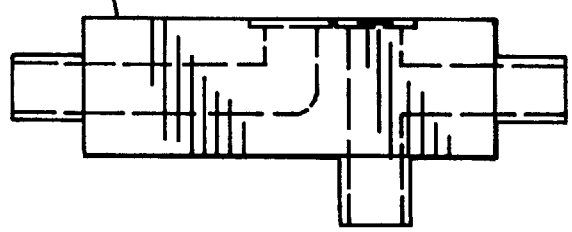
Figure 9D:
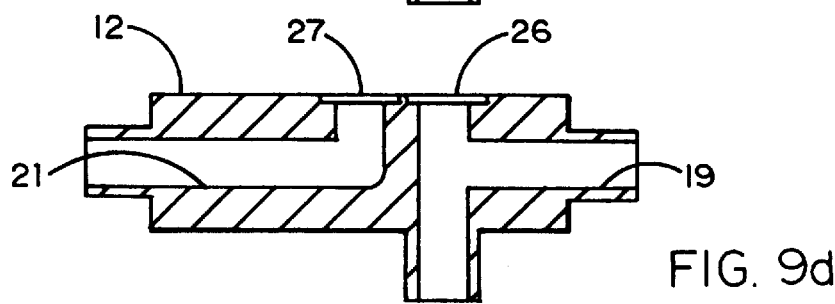
Figure 10A:
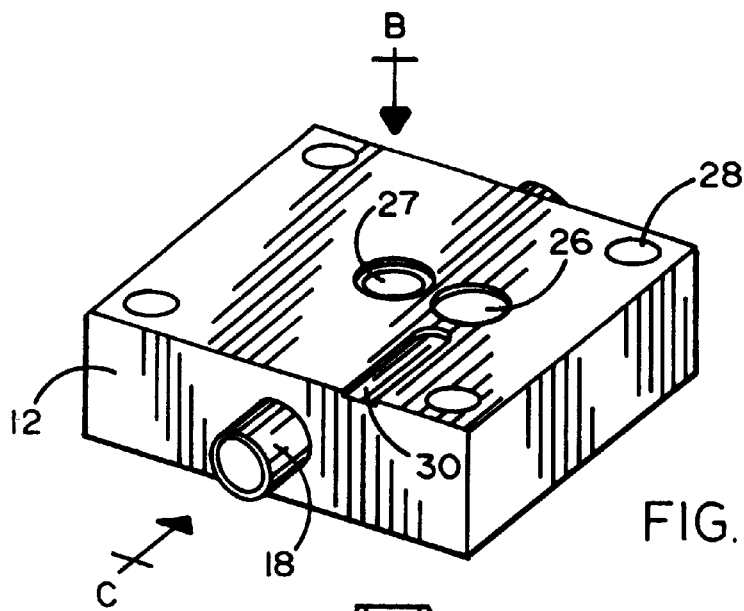
FIGS. 10A through 10D, illustrates an eighth embodiment of a modular block.
Figure 10B:
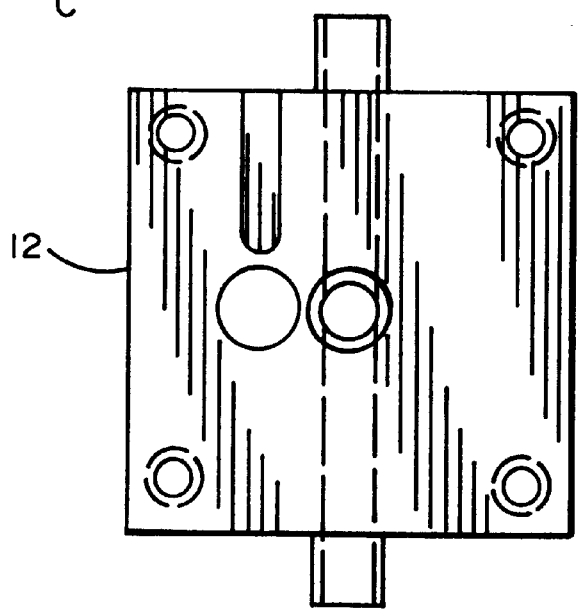
Figure 10C:
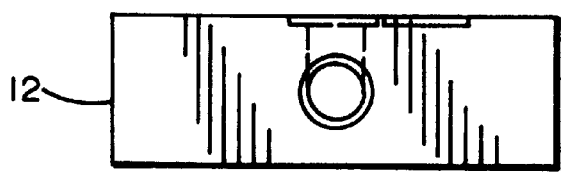
Figure 10D:
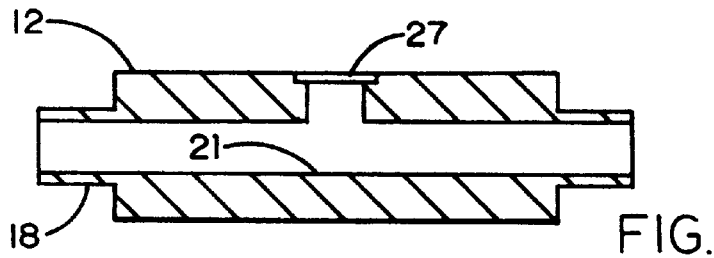
Figure 11A:
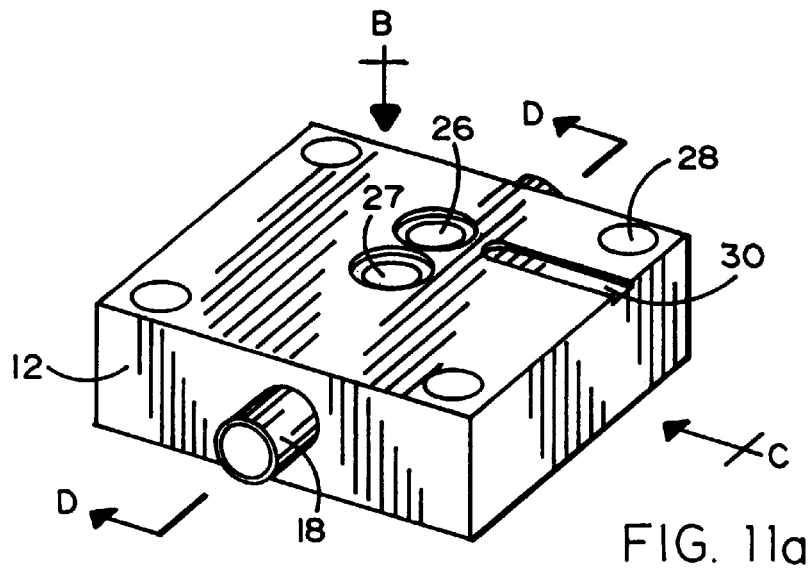
FIGS. 11A through 11D, illustrates a ninth embodiment of a modular block.
Figure 11B:
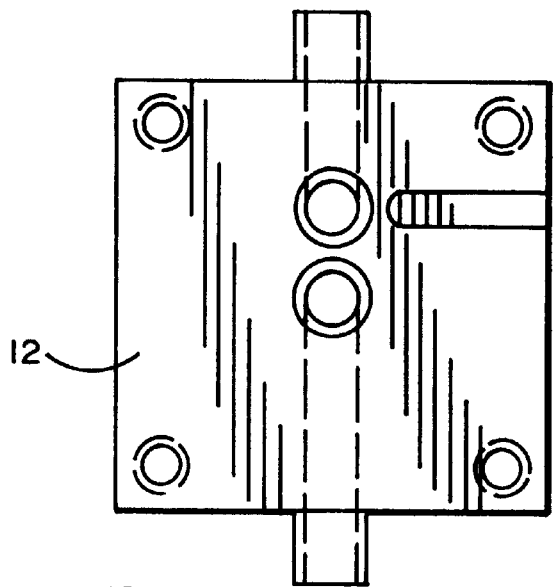
Figure 11C:
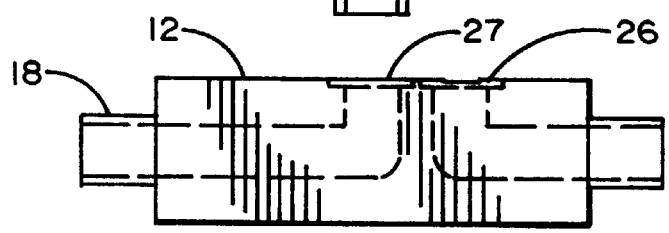
Figure 11D:
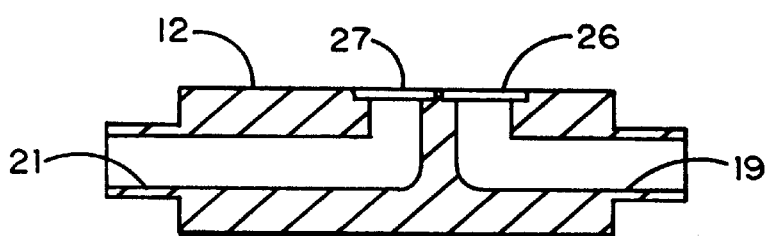
Figure 12A:
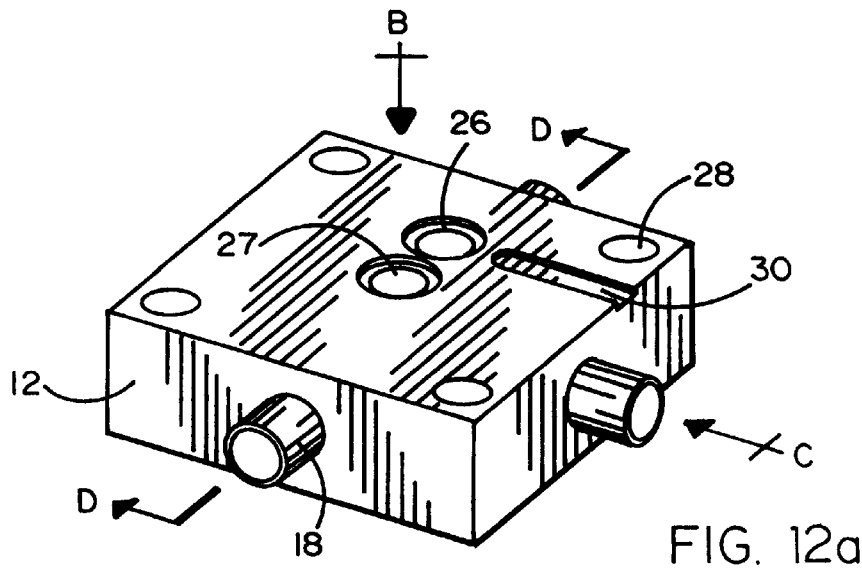
FIGS. 12A through 12D, illustrates a tenth embodiment of a modular block.
Figure 12B:
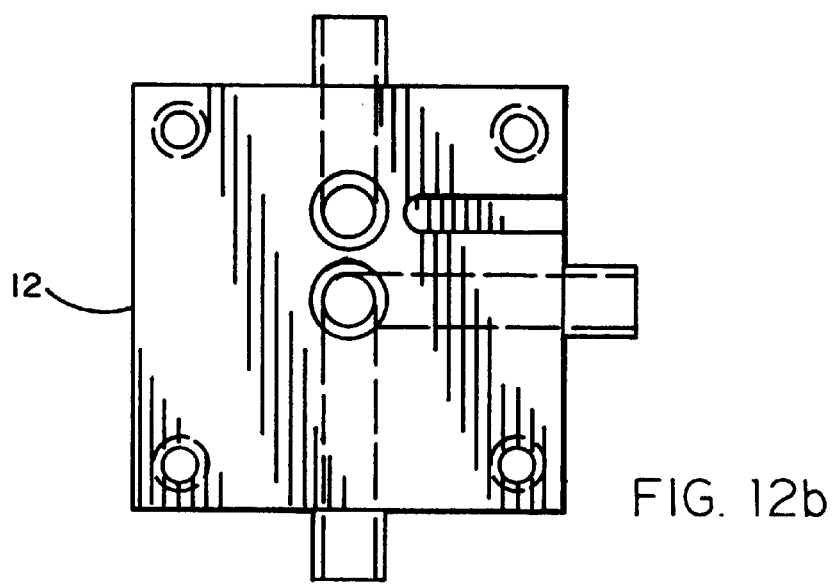
Figure 12C:
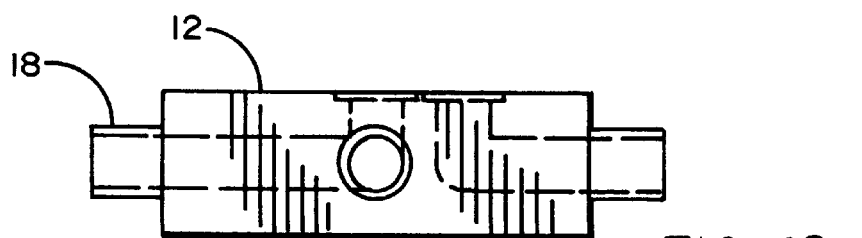
Figure 12D:
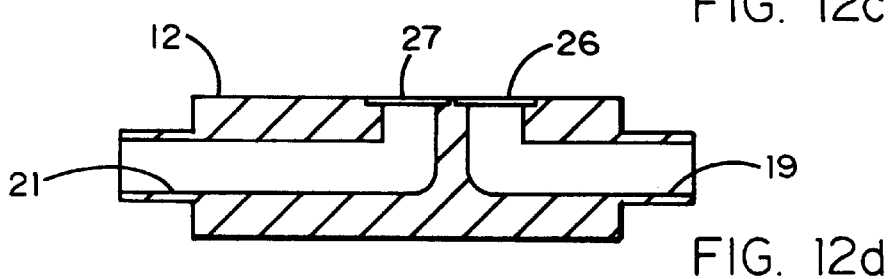

Referring to the accompanying drawings and specifically FIGS. 1 and 2, it will be seen that a gas flow system 10 in accordance with the present invention, comprises a plurality of interconnected machined monolithic modular blocks 12 to which there are connected a plurality of flow control components 14. The blocks 12 are interconnected by connector tube stubs 18 which are welded to one another to form a unitary leakproof interconnection. Standard components 14 are provided with respective base plates 16, each having a plurality of holes 24 through which respective threaded bolts 22 pass and thread into threaded holes 28 in each block 12. A seal (not shown) is normally position between the component and the block surface. The array of blocks 12 and connected components 14 form a gas flow system 10 having respective flow termination ports 20 which provide access to input and output gas flow.

The modular blocks 12 of the present invention are shown in a variety of alternative embodiments in FIGS. 3–12. Each such embodiment provides a pair of upper ports 26 and 27 and at least one connector tube stub 18. Each block also provides four threaded holes 28 and a leak test groove 30. A flow channel 19 leads from port 26 to a tube stub or port on another surface of the block. A flow channel 21 leads from port 27 to a tube stub or port on another surface of the block. The number and path of such flow channels, as well as the number of tube stubs can vary so that there is a "standardized" block configuration for every component 14 (in some cases two such components) and for every desired form of interconnection direction and type (i.e., direct, split, loop, etc.).

By way of example, the block of FIG. 3 comprises a full length straight-thru path 21 connected to port 27 and a half-length straight-thru path 19 connected to port 26. The block of FIG. 4 provides a ninety degree path 21 connected to port 27 and a half-length path 19 connected to port 26. The block of FIG. 5 provides half-length paths 19 and 21 at right angles and connected to ports 26 and 27, respectively. The block of FIG. 6 provides a full-length straight-thru path 21 connected to port 27 and a vertical down path 19 connected to port 26. The block of FIG. 7 has port 26 connected to a half-length path 19, port 26 also being connected to a bottom port 29 through a diagonal path 33 and port 26 connected to a side path 19. In each such configuration, a standard modular block is 0.5 inches high by 1.5 inches square and the tube stubs extend 0.25 inches beyond the block. Moreover, the block is machined from 316L bar stock to provide flow paths having a diameter of 0.125 inches.

The remaining configurations of FIGS. 8 through 12 are self-explanatory and of course, do not exhaust the possible variations which may be selected for standard module blocks of the invention. The key feature of all such blocks 12 is their welded interconnection which assures high purity, leak proof systems while obviating costly seals and hardware needed for bolted blocks of the prior art. The only bolts required in the gas flow systems configured with the modular blocks of the present invention, are those which secure one or two components to a block as shown in FIGS. 1 and 2.

Having thus disclosed a number of preferred embodiments which are merely exemplary and not limiting, what is claimed is:

1. A rectangular metal modular block for directing fluid flow therethrough and comprising:

at least one port for connection to a fluid control component and at least one tube stub or welded connection to another tube stub of another, adjacent block, said block having a selected internal fluid path between said port and said tube stub and a pluarlity of holes receiving fasteners for securing said component to said block.

2. The modular block recited in claim 1 further comprising at least two of said ports and least two of said tube stubs.

3. The modular block recited in claim 1 further comprising at least two ports on opposing surfaces for receiving two opposed components on said block.

4. A fluid control panel comprising:

a plurality of weldment interconnected, rectangular metal modular blocks, each such block having at least one port for connection to a fluid control component and at least one tube stub in welded contact to another of said such block adjacent thereto, each said block having a selected internal fluid path between said port and said tube stub and a plurality of holes receiving fasteners securing at least one said fluid control component to each said block.

5. The fluid control panel recited in claim 4 wherein at least one of said blocks comprises at least two of said ports and at least two of said tube stubs.

6. The fluid control panel recited in claim 4 wherein at least one of said blocks comprises at least two ports on opposing surfaces said ports receiving respective opposed components on said block.

* * * * *